July 15, 1958
G. WAHL ET AL
2,843,417
CONNECTING MEANS FOR THE VEHICLES OF LINK-TRAINS
Filed June 20, 1955
9 Sheets-Sheet 1
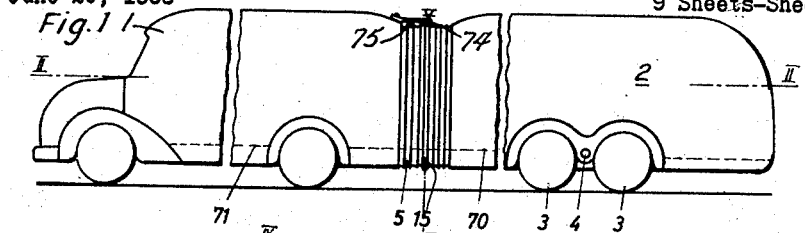
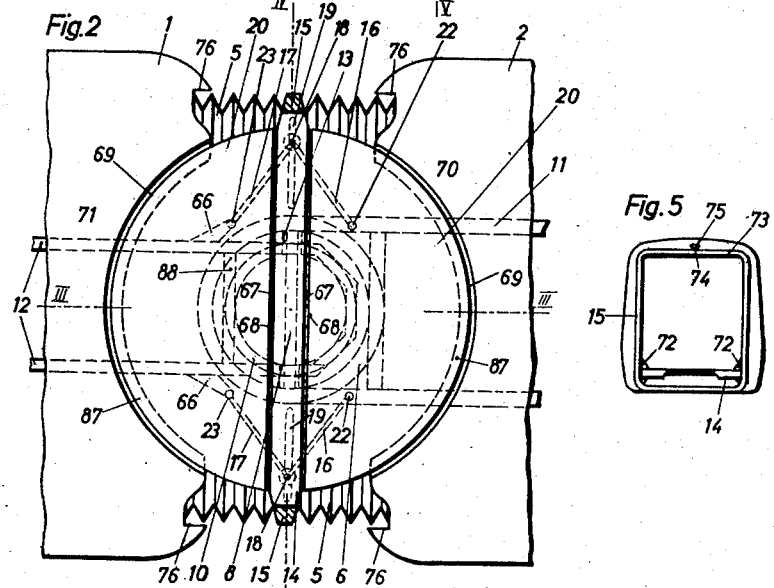
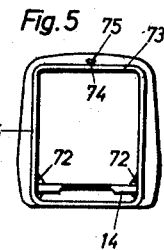
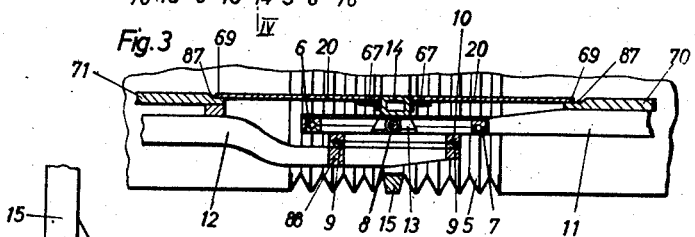
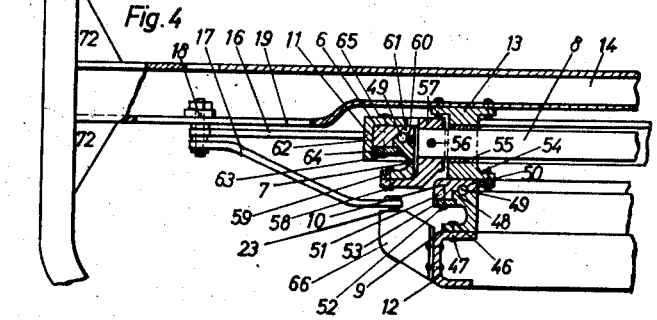
INVENTORS.
GEORG WAHL.
HANS SCHWAB.
BY
ATTORNEY.

July 15, 1958 G. WAHL ET AL 2,843,417
CONNECTING MEANS FOR THE VEHICLES OF LINK-TRAINS
Filed June 20, 1955 9 Sheets-Sheet 2
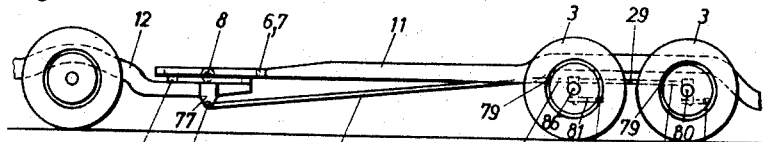
Fig. 6
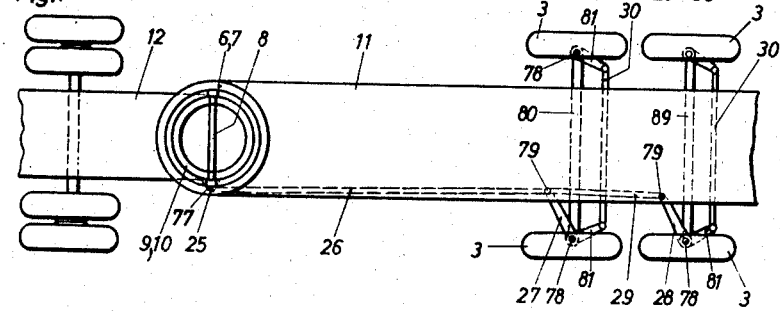
Fig. 7
Fig. 8
Fig. 9
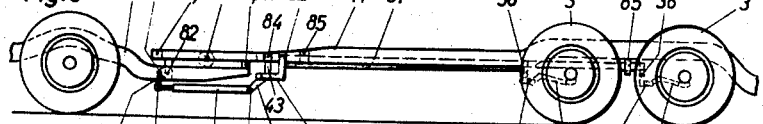
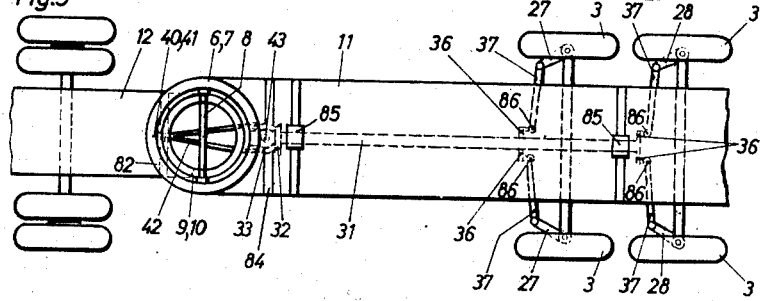
Fig. 10  Fig. 11  Fig. 12
INVENTORS.
GEORG WAHL.
HANS SCHWAB.
BY
ATTORNEY.

July 15, 1958  G. WAHL ET AL  2,843,417
CONNECTING MEANS FOR THE VEHICLES OF LINK-TRAINS
Filed June 20, 1955  9 Sheets-Sheet 3
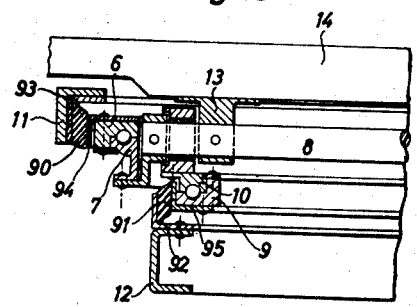
Fig. 13
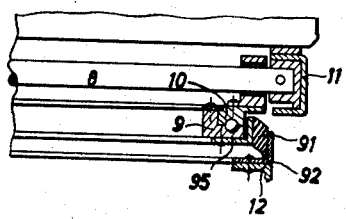
Fig. 14
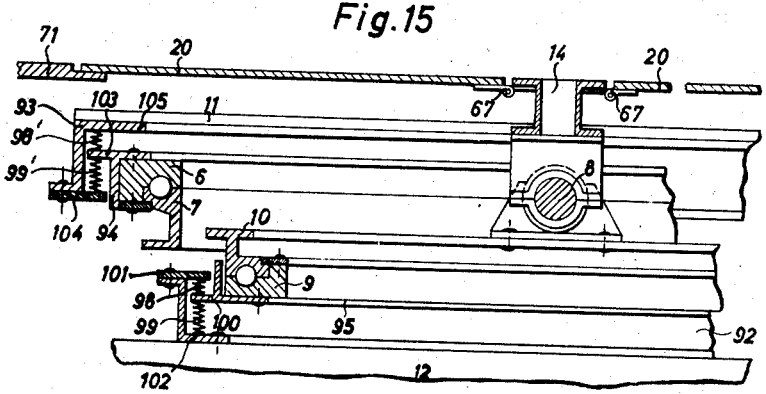
Fig. 15
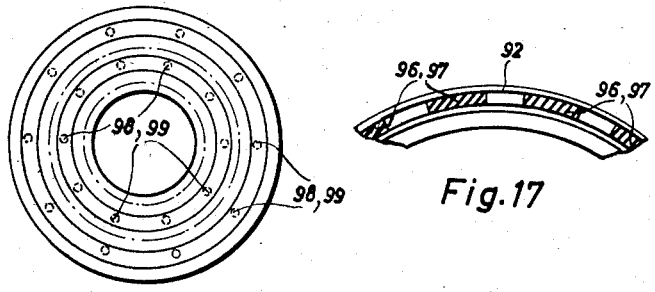
Fig. 16
Fig. 17
INVENTORS.
GEORG WAHL,
HANS SCHWAB.
BY
ATTORNEY.

July 15, 1958  G. WAHL ET AL  2,843,417
CONNECTING MEANS FOR THE VEHICLES OF LINK-TRAINS
Filed June 20, 1955  9 Sheets-Sheet 4

INVENTORS.
GEORG WAHL.
BY HANS SCHWAB.
K. H. Mayr
ATTORNEY.

July 15, 1958 G. WAHL ET AL 2,843,417
CONNECTING MEANS FOR THE VEHICLES OF LINK-TRAINS
Filed June 20, 1955 9 Sheets-Sheet 5

INVENTORS.
GEORG WAHL.
HANS SCHWAB.
BY K. B. Mayr
ATTORNEY.

INVENTORS.
GEORG WAHL.
BY HANS SCHWAB.
ATTORNEY.

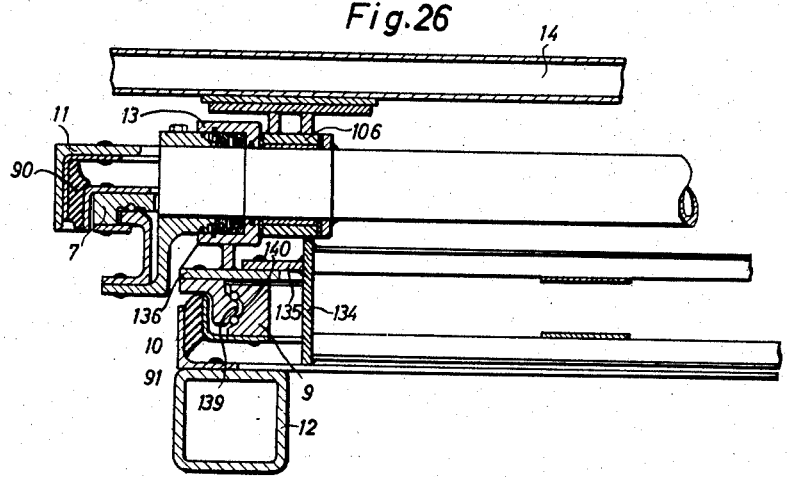
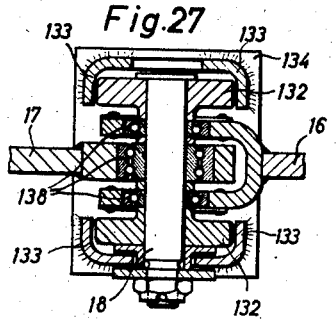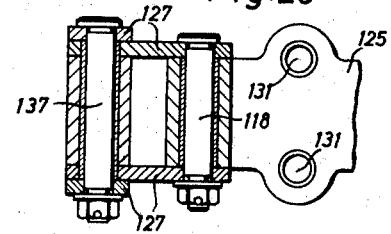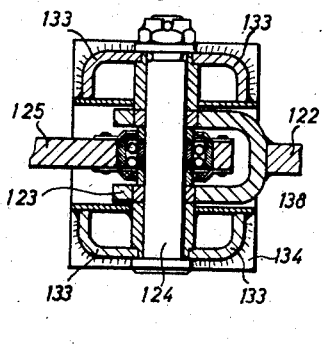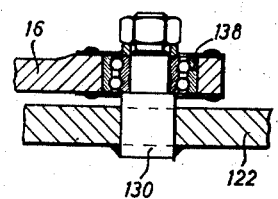

July 15, 1958 G. WAHL ET AL 2,843,417
CONNECTING MEANS FOR THE VEHICLES OF LINK-TRAINS
Filed June 20, 1955 9 Sheets-Sheet 8

INVENTORS.
GEORG WAHL.
HANS SCHWAB.
BY
ATTORNEY.

July 15, 1958  G. WAHL ET AL  2,843,417
CONNECTING MEANS FOR THE VEHICLES OF LINK-TRAINS
Filed June 20, 1955  9 Sheets-Sheet 9
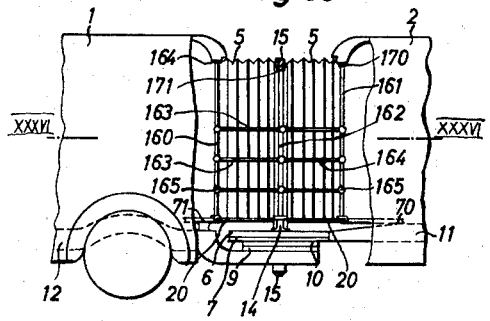
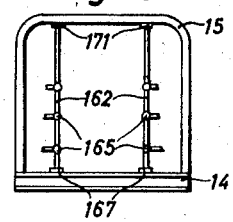
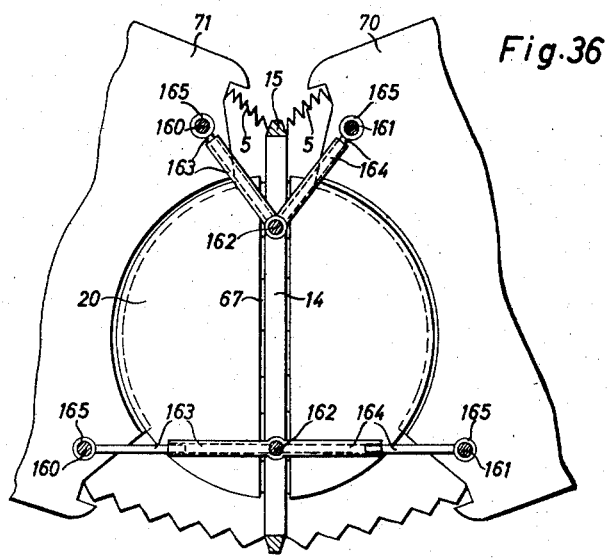
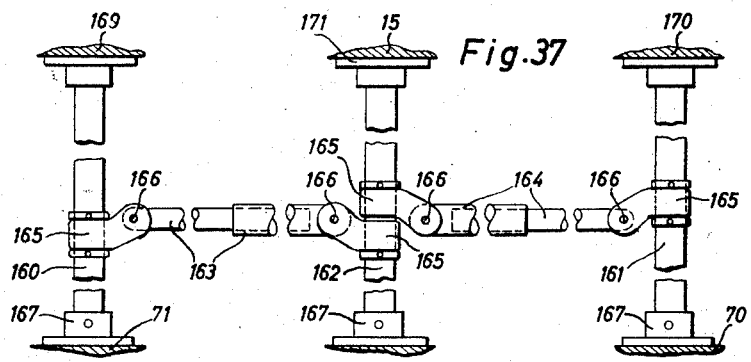
INVENTORS
GEORG WAHL.
HANS SCHWAB.
BY
ATTORNEY.

United States Patent Office 2,843,417
Patented July 15, 1958

2,843,417

CONNECTING MEANS FOR THE VEHICLES OF LINK-TRAINS

Georg Wahl, Ulm (Danube), Soflingen, and Hans Schwab, Pfaffenhofen, near Neu-Ulm, Germany, assignors to Karl Kassbohrer G. m. b. H., Ulm (Danube), Germany, a firm Application June 20, 1955, Serial No. 516,482

22 Claims. (Cl. 296—1)

This invention relates to a link-train of two or more vehicles, and is particularly directed to connecting means for the vehicles which without a drawbar between them are rotatably coupled to each other and thus form the link-train.

Link-trains of this kind are particularly suited for the transport of passengers, as because of the direct connection of the vehilces it is easily possible to form with the aid of concertina walls a continuous interior space.

A link-train of this type consists of a traction vehicle and at least one trailer. If the link-train is to be employed for traveling on roads, it is advisable to have the trailer rest with its forward end on the rear end of the traction vehicle, whereby the wheels may be so arranged at the trailer that only a small portion of the weight of the trailer is supported by the traction vehicle.

The object of the invention is to devise the connecting means between the individual vehicles in such manner that thereby the travelling qualities of the link-train, as well as the travelling comfort and the safety of the passengers are considerably improved, and that, furthermore, also the lifetime of the link-train and its connecting means is considerably lengthened.

According to the invention the connecting means consist of a combination of cooperating means, viz. of coupling means transmitting the tractive power of the motor vehicle to the trailer and the pressure of the load of the trailer to the traction vehicle; furthermore, of means closing up the link-place toward the outside and forming the passage between the several vehicles; and, finally, of means permitting the steering of the trailer or trailers, which for link-trains are of considerable advantage and in many cases of absolute necessity in order to achieve satisfactory travelling qualities for the vehicles in curves.

Hence, the object of the invention is to devise for the several vehicles of link-trains connecting means which transmit in absolutely reliable manner the tractive power as well as the pressure of the load regardless of the positions of the vehicles with respect to each other; which prevent inadmissible twisting of the vehicle frames; which enable in spite of the Cardan-like coupling a perfect steering of the trailers; and which, furthermore, permit a safe and comparatively noiseless passing through the vehicles, as well as an all-round closed passage with the aid of concertina walls surrounding not only the coupling means but also the steering rods for the trailer.

According to the invention the individual vehicles are rotatably coupled to each other in two planes by means of swivels and a transverse shaft, whereby the coupling is provided with two superposed turn-rings, consisting each of a pair of swivels of which each of the outer ones is rigidly secured to one of the vehicle frames, while the inner ones are supported by means of plain bearings for rotatable movement of the swivels on the transverse shaft for swinging movement with respect to each other, whereby the transverse shaft is guided by guide-rods linked to both of the vehicle frames always into a position bisecting the angle formed by the two vehicles with respect to each other.

The invention is further characterized by the feature that the plain bearings carry a cross-beam provided with elongated slots in which the guide rods engage for joint guiding of the cross-beam and of the transverse shaft.

Important is also that the cross-beam carries a frame-like yoke serving as supporting means for the concertina walls surrounding, for the formation of a perfectly closed-up connecting passage, also the coupling means and possibly also the steering rods extending from the frame of the traction vehicle to the wheels of the trailer.

Important is further the arrangement within the space surrounded by the concertina walls of steering rods engaging at the frame of a single vehicle, and which via steering rods extending throughout the length of the trailer steer the hind-wheels of the trailer when the traction vehicle is in oblique position with respect to the trailer.

Still another feature of the invention is the provision of sector-like floor-plates, covering up the coupling means and having a straight-lined edge hingedly secured to the cross-beam.

The invention improves considerably the connecting means between the individual vehicles of a link-train, whereby these connecting means consist of a coupling device, and of means forming an all-round closed passage between the vehicles, as well as of steering means extending from the traction vehicle to the trailer for the steering of the wheels of the trailer. The safety is cosiderably increased by the use of a surface coupling capable of transmitting occurring stresses in a much better way than a one-point coupling, for example a ball coupling, as used hitherto for coupling the individual vehicles of a link-train together. For the transport of passengers greatest importance must be attached to the safety of the passengers. It is true that it is already known from semitrailer trucks to couple the traction vehicle to the trailer by means of a turn-ring consisting of two swivels, of which one carries a transverse shaft coupled by means of a slide-bearing direct to the trailer. However, when compared with a coupling of this known type, the coupling means of the invention have the advantage that the possibility of twisting of the frames of the individual vehicles is thereby practically eliminated. For, whenever the link-train of the invention passes through a curve, the transverse shaft of the novel coupling is immediately guided into a middle position, which means that it takes up a position bisecting the angle formed by the vehicles, while in the known turn-ring coupling the transverse shaft is stationarily arranged at the frame of an individual vehicle. The new coupling also prevents dislocation in height of the vehicles with respect to each other when the vehicles pass over unevennesses of the ground or road, whereby the transverse shaft guided into the middle position constitutes a very favorable link-shaft, and whereby rubber cushioning means interposed between the turn-rings and the vehicle frames may produce particularly favorable results.

The transverse shaft and its bearings can also be used with advantage as supporting means for a cross-beam which conjointly with the transverse shaft is likewise always guided into the middle position. That is why it is possible to use the cross-beam as supporting means for a yoke having its cross-section adapted to that of the individual vehicles and so devised that it also surrounds the coupling means. It the yoke is utilized as supporting frame for concertina walls having their ends fastened to the bodies of the individual vehicles, a connecting passage betwen the vehicles can be produced with the aid of the yoke which is on all sides completely covered up toward the outside and which may have the width of the vehicles themselves, if desired. While hitherto the concertina walls merely had their ends fastened to the bodies of the vehicles, they are now very definitely supported by the yoke, so that compression by the driving-wind and damaging on the inside are reliably prevented. In this way and through the provision of a hand-rail within the passage the safety for the passengers is considerably augmented. Furthermore, the concertina walls do not only protect the passengers against dirt and draught, but also protect the coupling means and the joints of the guide rods coupled to the traction vehicle against moisture and soiling, as it is now possible, because of the frame-like yoke, to give the concertina walls the shape of an all-round closed hose.

In addition to this, the feature that the cross-beam is always guided or steered into the middle position, as hereinbefore described, permits a particularly suitable and noiseless construction of the passage between the vehicles, as the passage floor, consisting of a plurality of sector-like floor plates, adapts itself, also during the passage through curves and over unevennesses of the ground, to the position of the floors of the individual vehicles without gaping and rattling, as it always snugly clings to underlying supports and in addition to this can be cushioned by rubber strips or the like. Apart from this, the floor plates are supported by the cross-beam with such relative safeness that a temporary stay of a passenger in the passage during the traveling involves absolutely no risk.

Last but not least, the novel coupling permits the arrangement beneath the coupling means within the space surrounded by the concertina walls, of steering rods extending from the frame of the traction vehicle and which by means of additional steering rods steer the wheels of the trailer and in this way increase the travelling safety of the link-train. An arrangement like this makes it possible to provide the link-train of road vehicles with second trailers provided with the same connecting means as the first trailer, whereby the feature has to be taken into consideration that the Cardan-like coupling means permit a displacement of the vehicles with respect to each other not only in lateral direction but also in height.

A link-train as hereinbefore described serves in the first place as means of transport for passengers, not only on the road but also on rails, but may also be employed, as the inner space extends through the entire length of the plurality of vehicles, for the transport of loads, particularly for the transport of motor cars or tractors, and for this purpose may be of the double deck type.

Additional features and advantages of the invention will be understood from a consideration of the following detailed description taken in connection with the accompanying drawings forming a part of this specification and in which several embodiments of the invention are shown by way of example. However, we wish to say that the invention is not confined to any strict conformity with the showing of the drawings, but may be changed or modified, so long as such changes or modifications mark no material departure from the salient features of the invention as expressed in the appending claims.

In the drawings, in which like parts are referred to by the same reference numerals in all the several figures, Fig. 1 is a side-view of a link-train;

Fig. 2 is a cross-section of the coupling means, on an enlarged scale, on line II—II of Fig. 1;

Fig. 3 is a partial cross-section of the coupling means, on line III—III of Fig. 2;

Fig. 4 is a partial cross-section of the coupling means, on line IV—IV of Fig. 2;

Fig. 5 is a cross-section on line V—V of Fig. 1;

Fig. 6 is a side-view of the running gears provided with the novel coupling means and with a second steering contrivance;

Fig. 7 is a bottom plan view of the running gears of Fig. 6;

Fig. 8 is a side-view of the running gears provided with the novel coupling means and with a further form of steering contrivance;

Fig. 9 is a bottom plan view of the running gears of Fig. 8;

Figs. 10, 11 and 12 are detail views, on an enlarged scale, of the embodiment of Figs. 8 and 9;

Figs. 13, 14 and 15 are partial sectional views of modifications of the coupling;

Figs. 16 and 17 are detail views of the couplings shown in Figs. 13, 14 and 15;

Figure 18:
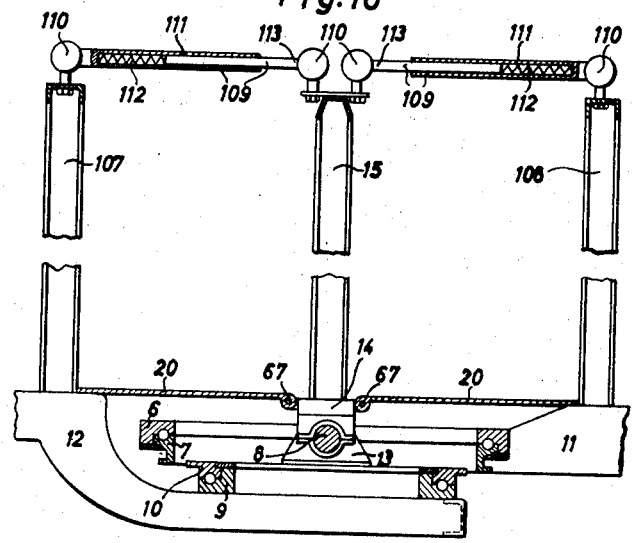
Figure 19:
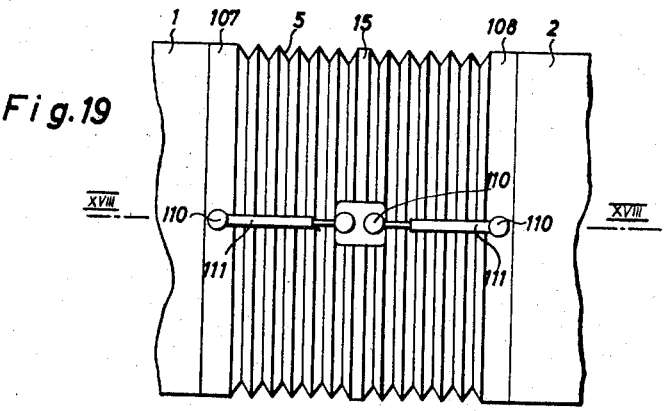
Figure 20:
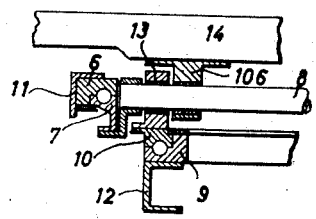
Figure 21:
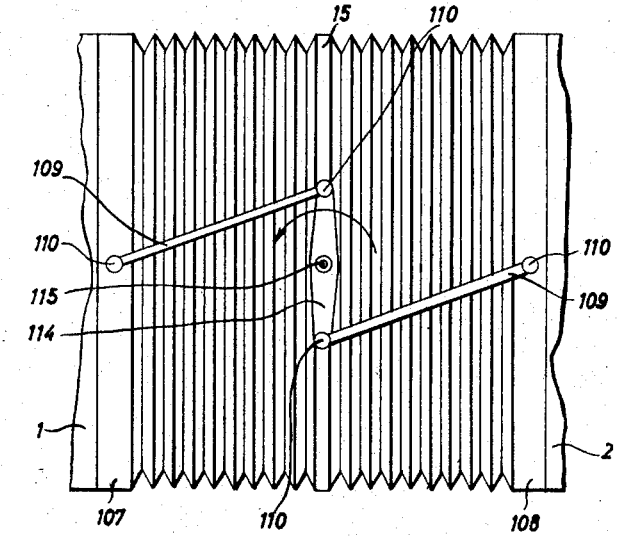
Figure 22:
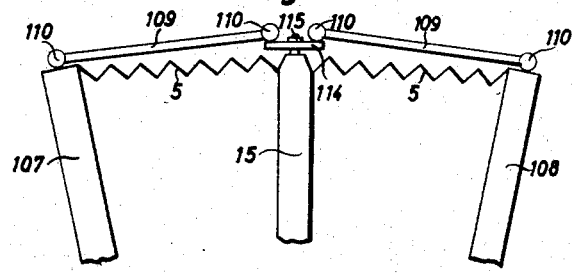
Figure 23:
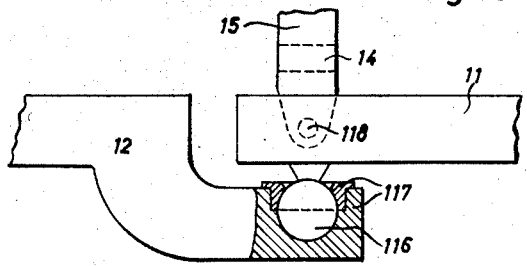
Figure 24:
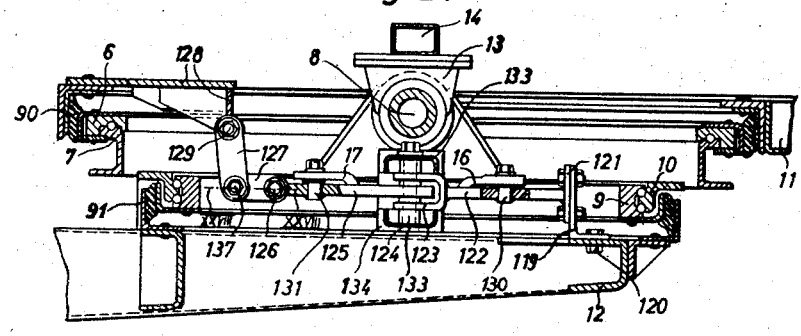
Figure 25:
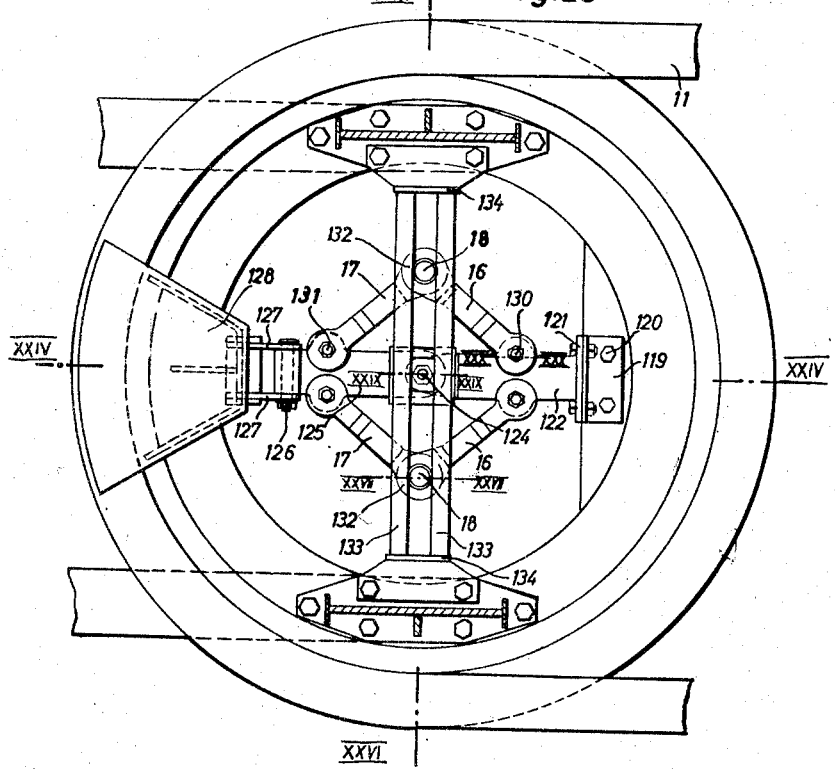
Figure 33:
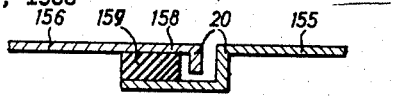
Figure 34:
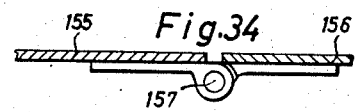
Figure 31:
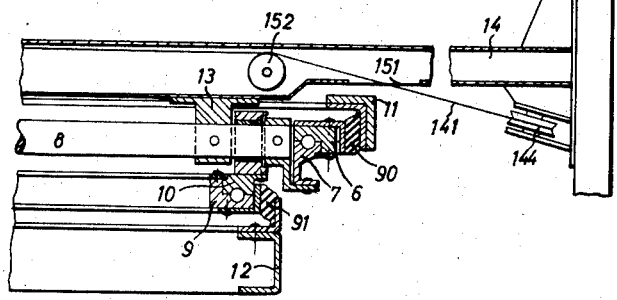
Figure 32:
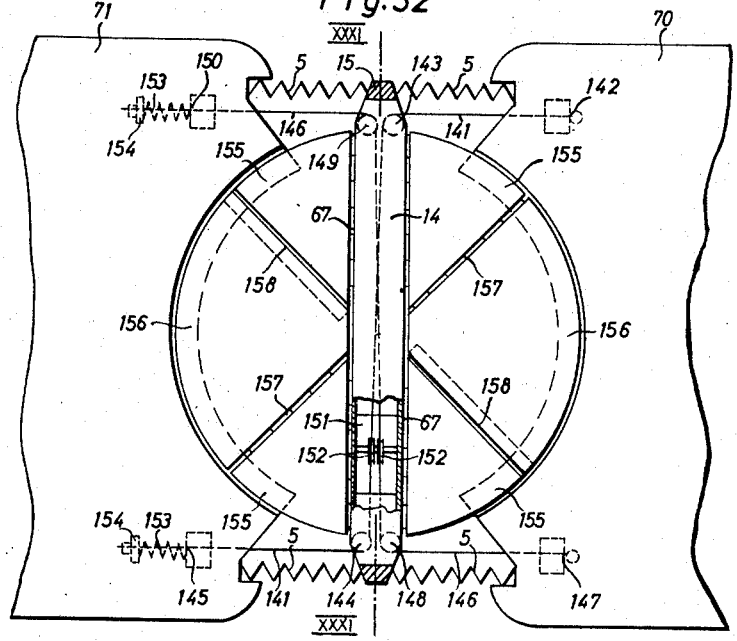

Figs. 18, 19, 20, 21, 22 and 23 show an improved construction of the connecting passage between the vehicles, protecting the concertina walls against wear, whereby Fig. 18 is a cross-section on line XVIII—XVIII of Fig. 19; Figs 19 and 21 are top-views of the concertina walls; and Figs. 20, 22 and 23 are detail views;

Figs. 24, 25, 26, 27, 28, 29 and 30 show a modification of the guiding means of Figs. 2 and 4 for the cross-beam, yoke and shaft, whereby Fig. 24 is a cross-section on line XXIV—XXIV of Fig. 25; Fig. 25 is a top-view (cross-beam and transverse shaft having been removed for clearness of illustration); Fig. 26 is a sectional view on line XXVI—XXVI of Fig. 25; Fig. 27 is a detail sectional view on line XXVII—XXVII of Fig. 25; Fig. 28 is a detail sectional view on line XXVIII—XXVIII of Fig. 24; Fig. 29 is a detail sectional view on line XXIX—XXIX of Fig. 25; Fig. 30 is a detail sectional view on line XXX—XXX of Fig. 25;

Figs. 31 and 32 show another modification for the guiding of the cross-beam, yoke and shaft, whereby Fig. 31 is a partial cross-section on line XXXI—XXXI of Fig. 32; Fig. 32 is a top-view of the modified form of construction;

Figs. 33 and 34 are detail sectional views of the modified form of construction shown in Fig. 32;

Figs. 35, 36, 37 and 38 show an improved construction of the connecting passage between the vehicles, whereby Fig. 35 is a side-view of the passage; Fig. 36 is a cross-section on line XXXVI—XXXVI of Fig. 35; Fig. 37 is a detail-view on an enlarged scale; and Fig. 38 is a vertical sectional view.

Referring more particularly to the drawings, the link-train consists of a traction vehicle 1 and a trailer 2 having its forward end coupled to and resting upon the rear end of the traction vehicle 1. The trailer 2 is at its rear end supported on four wheels arranged at a common jointed cross shaft axle 4. The wheels 3 are arranged at the trailer 2 in such manner that they support the main weight of the latter, while onily a small portion of the trailer-weight rests upon the rear end of the traction vehicle 1 (see Fig. 1).

The traction vehicle 1 is provided with a frame 12 which behind the rear wheels is of downwardly cranked formation and whose end, by means of cross-bar 88, is rigidly connected to horizontally extending swivel 9 (see Figs. 4 and 3). The swivel 9 is of U-shaped cross-section, whereby one of the flanges 46 of the horizontally extending U-shaped swivel is secured to the end of the frame 12 by means of screws or rivets 47, while the other one of the flanges 48 is provided with a groove for the engagement therein of steel-balls 49.

On the swivel 9 is supported a second swivel 10 of angular cross-section. The horizontally extending portion 50 of the swivel 10 is likewise provided with a groove for the steel-balls 49. The vertically extending flange 51 of the swivel 10 rests against the flange 48 of the swivel 9 and carries at its lower end by means of screws 52 an annular flange 53 which with slight play engages beneath the flange 48 of the swivel 9 and thus prevents the swivel 10 from being lifted off the swivel 9.

Fastened at diametrically opposed places on the swivel 10 by means of screws 54 are two supporting blocks 13 having arranged in their bores plain bearing bushings 55 for the support of a transverse shaft 8 of steel. Both of the ends of the transverse shaft 8 project beyond the supporting blocks 13 and are secured by means of pins 56 in eyes 57 from which an annular flange 58 is rigidly suspended.

Screwed onto the annular flange 58 is another swivel 7 of U-shaped cross-section by means of its flange 59, while its second flange 60 is provided wih a groove for the steel-balls 49.

On the swivel 7 is supported an angular swivel 6 provided in its horizontally extending flange 61 with a groove for the balls 49. The vertically extending flange 62 rests against the flange 60 of the swivel 7 and carries by means of screws 63 a flange 64 which engages with play beneath the flange 60 of the swivel 7 and thereby prevents the swivel 6 from being lifted off the swivel 7. The swivel 6 is by means of screws or rivets 65 rigidly secured to the forward end of the frame 11 of the trailer 2, which frame 11 is of somewhat larger width than the frame 12 of the traction vehicle. In order to counterbalance rolling movements of the vehicles with respect to each other, and in order to reliably prevent any kind of distortional deformation of the frames 11 and 12, the swivels 6 and 9, or at least one of them, may be elastically supported at the appertaining frame 11 or 12. For this purpose the swivels 6 and 9 are supported at their frames 12 and 11 (see Figs. 13 and 14) with the aid of rubber members 90 and 91, whereby the rubber members 90 and 91 are reliably secured through vulcanizing or cementing, on the one hand, to supporting rings 92 and 93 secured directly to the frame 12 or 11, and, on the other hand, to rings 94 and 95 serving as supporting means for the swivels 6 and 9. The rubber members 90 and 91 may be of annular formation (see Fig. 13), or be subdivided into individual blocks 96 or 97 (see Fig. 17).

It is advisable that not only the turn-ring 9, 10, but also the turn-ring 6, 7 are secured by the aforedescribed rubber members to their respective frame for increasing the elasticity of the connection. However, according to the invention it will suffice when only one of the turn-rings is elastically supported with respect to its frame, as in most cases a satisfactory elasticity will be achieved that way. But also in couplings of the known kind, consisting merely of one single turn-ring and one transverse shaft (see Fig. 14), the elastic support of the swivel 9 with respect to the frame 12 by means of a rubber member 91 eliminates satisfactorily the deficiencies usually shown by a coupling of this kind.

It is possible also to substitute for the rubber means 90, 91 helical springs 98, 99 and 98′, 99′ of steel (see Figs. 15 and 16). For this purpose the supporting ring 95 of the swivel 9 is provided with a flange 100, and the ring 92 for supporting the turn-ring 9, 10 on the frame 12 is provided with an inwardly extending flange 101. Between the flanges 100 and 101 and a fastening flange 102 of the supporting ring 92 are arranged the helical springs 98 and 99. In the same way the supporting ring 94 of the swivel 6 is provided with a flange 103, and the supporting ring 93 connected with the frame 11 is provided with a flange 104 and at the upper end with a fastening flange 105. The springs 98′ and 99′ are arranged between the flanges 103, 104 and 105. Preferably the lower springs 99 should be longer than the upper springs 98, as the lower springs 99 produce the desired elasticity, while the upper springs 98 chiefly prevent the contact between the flanges. Here, too, only one of the turn-rings may be provided with steel springs. To substitute for the rubber means or steel springs other elastic means of known kind is likewise possible.

The supporting blocks 13 support a cross-beam secured to the supporting blocks 13 by means of screws, and consisting for example of a square tube 14 positioned directly above the transverse shaft 8 and extending parallel to the latter over a considerable portion of the width of the bodies of the individual vehicles 1 and 2 (see Fig. 2).

The cross-beam 14 carries at its ends by means of stays 72 a frame-like yoke 15 whose cross-section is approximately alike to the cross-section of the bodies of the vehicles 1 and 2, and which permits passage from the traction vehicle 1 to the trailer 2. The upper cross-bar 73 of the yoke 15 (see Fig. 5) is provided in its middle accurately above the center of the turn-rings 9, 10 and 6, 7 with a pivot bolt 74 at which engages a supporting arm 75 provided at the roof of the traction vehicle and which thus rotatably secures the yoke 15 in its position.

The yoke 15 also passes below the cross-beam 14 and the coupling means and supports as all-round closed frame, concertina walls 5 of tubular shape having their ends fastened in recesses 76 of the traction vehicle 1 and of the trailer 2 (see Fig. 2). The concertina walls 5, therefore, pass likewise underneath the vehicle frames 11 and 12, approximately at the height of the lower end of the bodies of the traction vehicle 1 and the trailer 2, as shown in Figs. 1 and 5, so that the concertina walls 5 also protect the coupling means and the passengers or load against dirt and draught from below, while, on the other hand, the concertina walls are reliably safeguarded by the yoke 15 against compression by the driving wind or other stresses. For the protection of the concertina walls 5 it is advisable that the yoke 15 is rotatably supported in longitudinal direction of the vehicles with respect to the two frames 11 and 12, so that it is enabled to take up a middle position when undulating ground or the like has to be crossed. For this purpose the cross-beam 14 is arranged with respect to the two frames 11 and 12 in such manner that it is enabled to swing by means of bearings 106 on the shaft 8 (see Fig. 20). This makes it possible for the yoke 15 to always adjust itself in such manner that it bisects the angle formed between the end rib 107 of the traction vehicle 1 and the end rib 108 of the trailer 2 (see Fig. 22).

Ordinarily this adjustment of the yoke 15 in middle position is automatically achieved by the concertina walls 5 themselves, because of their stiffness. However, in order to reliably effect this adjustment in middle position also in case of shocks and other disturbances, the end ribs 107 and 108 of the vehicles 1 and 2 are connected with the yoke 15 by means of rods 109. As shown in Figs. 18 and 19, the yoke 15 is provided at its upper end with two universal joints 110, for example ball-joints, from which rods 109 extend to similar joints 110 provided on the end ribs 107 and 108. In the embodiment of the invention shown in Figs. 18 and 19, the rods 109 consist of a telescope tube 111 and of a rod 113 sliding in the telescope tube against the resistance of a spring 112. Important is that the rods 109 are of uniform length, and that the springs 112 are equally powerful. When the end ribs 107 and 108 are inclined toward each other, or diverge from each other at their upper ends, the rods 109 force the yoke 15 into the position bisecting the angle formed between the end ribs 107 and 108, as the pressures exerted by the springs 112 always tend to counterbalance each other.

Figs. 21 and 22 show another example how the adjustment of the yoke 15 in middle position may be achieved. In this form of construction an equal-armed double lever 114 is rotatably mounted by means of a vertical pivot 115 on the top of the yoke 15. Here again the double-armed lever 114 is provided at both of its ends with universal joints 110 from which extend rods 109 to the joints 110 provided on the end ribs 107 and 108, whereby the rods 109 are again of uniform length. If the end ribs 107 and 108 diverge in upward direction, the rods 109 rotate the double lever 114 in the direction of the arrow (see Fig. 21) about the pivot 115, and the latter remains together with the yoke 15 in the middle between the end ribs 107 and 108 as, because of the equal length of the arms of the double lever 114 and the equal length of the rods 109, the positions of the rods on the left side and right side of the yoke 15 are always the same. If the end ribs 107 and 108 diverge in downward direction, the position of the yoke 15 is adjusted exactly the same way.

The adjustment of the yoke 15 into the position bisecting the angle between the end ribs 107 and 108 can be effected independent of the construction of the coupling means between the two vehicles 1 and 2. Fig. 23 shows a universal joint whose ball 116 is fastened at the frame 11 of the trailer 2, while the cage 117 for the ball 116 is provided at the frame 12 of the traction vehicle 1. In this case the cross-beam 14, and consequently also the yoke 15, are rotatably secured to the frame 11 by means of a transversely extending bolt 118, and for that reason are also enabled to adjust themeselves in the middle between the end ribs 107 and 108.

In order to guide the yoke 15 as well as the shaft 8 into the position of the bisecting line of the angle formed by the vehicles 1 and 2 during their passage through curves, the cross-beam 14 is provided in its lower wall, at the ends of the latter, with elongated slots 19 in which shiftably engage pivot bolts 18 (see Fig. 4). At the downwardly projecting end of the pivot bolt 18 engage on top of each other a guide rod 16 and a guide rod 17. The guide rod 16 is by means of a pivot bolt 22 coupled to the trailer frame 11, while the guide rod 17 is by means of a pivot bolt 23 horizontally rotatably connected to the frame 12 of the traction vehicle 1. The bolt 23 is carried by an arm 66 fastened at the frame 12, so that the guide rods 16 and 17 are of uniform length. Seen in the bottom plan, the guide rods 16 and 17 are symmetrically positioned with respect to the cross-beam 14. In an arrangement like this the cross-beam 14, and consequently also the shaft 8, always bisect the angle formed by the principal axes of the two vehicles 1 and 2, regardless of the positions which the two vehicles take up with respect to each other when they are passing through curves. In addition to this, the yoke 15 is always positioned in the longitudinal middle of the concertina walls 5. It is not absolutely necessary that two guide rods 16 and 17 engage at each end of the cross-beam 14. In order to achieve the aforesaid result it suffices when only one pair of guide rods exists, for example only the guide rods 16 and 17 shown at the upper end of Fig. 2.

It is of considerable advantage to arrange the guide rods 16 and 17 within the turn-ring coupling as shown in Figs. 24 to 30. For this purpose a supporting angle 119 has been fastened by means of screws 120 at the frame 12 of the traction vehicle 1. Stationarily secured to the angle 119 by means of a plate 121 is a rigid arm 122 projecting in horizontal direction into the center of the turn-ring coupling and terminating at its free end in a fork-shaped head 123. The forked head 123 carries a bolt 124 co-ordinating with the geometrical axis of the turn-ring coupling and serving as bearing for another arm 125 horizontally rotatable about the bolt 124 (see Figs. 24, 25 and 29). Rotatably coupled to the arm 125 by means of a bolt 126 are double link plates 127, which are connected with the frame 11 of the trailer 2 via a bolt 129 fastened at an abutment 128. The guide rod 16 is coupled to the arm 122 by means of a bolt 130, and the guide rod 17 is coupled to the arm 125 by means of a bolt 131. At their free ends both guide rods 16 and 17 are again connected with each other by means of the pivot bolt 18. However, in this case the pivot bolt 18 is provided with slide plates 132 sliding in guides 133 (see Fig. 27). The guides 133 extend beneath the transverse shaft 8 and parallel to the latter and have each of their ends welded to a plate 134 (see Fig. 26) which in each case is rigidly connected by means of a plate 135 via an abutment 136 with the swivel 10.

If now, when the vehicles are moving through curves, the vehicles become laterally displaced with respect to each other, whereby the arm 122 corresponds to the principal direction of the traction vehicle 1, while the arm 125 corresponds to the principal direction of the trailer 2 as the double link plates 127 transmit the swinging movement of the frame 11 to the arm 125 and always carry the latter along, then the bolt 18 with its plates 132 slides along in the guides 133 and thereby always adjusts these guides 133 as described already in the first example in such manner that they bisect the angle formed by the two vehicles. As the swivel 10 is rigidly connected with the guides 133, it (the swivel 10) participates in the adjusting movement, which also applies to the transverse shaft 8 fastened at the swivel 10, as well as to the cross-beam 14 supported on the transverse shaft 8. If, furthermore, the vehicles when passing through curves simultaneously also become displaced with respect to each other in height when moving, for example, over a transversely extending elevated strip of ground, then the frame 11 of the trailer 2 is enabled, as heretofore already explained, because of the arrangement of the swivel 6 fastened to the frame 11, on the transverse shaft 8, to swing about the transverse shaft 8. This, however, results in a change of distance between the bolt 126 at the arm 125 and the bolt 129 at the abutment 128. But because of the arrangement between the two bolts 126 and 129 of the double link plates 127 a change of distance like this is possible without difficulty, as the double link plates 127 are so devised and arranged that they are in approximately rectangular position with respect to each other when the upper turn-ring 6, 7 and the lower turn-ring 9, 10 extend parallel to each other. The double link plates 127, therefore, can either be opened or folded up according to requirements. The double link plates 127 are pivotally connected to each other by means of the bolt 137 (see Figs. 24 and 28).

It should further be mentioned that in order to facilitate operation all articulations on the guide rods 16 and 17 as well as on the arms 122 and 125 are provided with ball-bearings 138.

Very advisable is further a construction of the swivels 9 and 10 in such manner that the swivel 10 engages with a conical annular bead 139 in a corresponding annular groove 140 of the swivel 9, and that both of the inclined surfaces thereby produced are supported with respect to each other by balls. A construction like this prevents a lifting of the swivel 10 off the swivel 9 and simultaneously facilitates operation of the swivels 9 and 10 (see Fig. 26).

Another construction for guiding the cross-beam 14 as well as the yoke 15 and transverse shaft 8 into a position bisecting the angle formed by the two vehicles in a curve is shown in Figs. 31 and 32. The advantage of a construction like this resides in the feature that the hollow interior of the cross-beam 14 can be utilized for the accommodation therein of transmitting means. For this purpose a pull-cable 141 extends from a fastening place 142 at the vehicle 2 via a guide pulley 143 provided at the cross-beam 14, and a second guide pulley 144 to a fastening place 145 provided at the vehicle 1. In the same manner a second pull-cable 146 passes from a fastening place 147 at the vehicle 2 via guide pulleys 148 and 149 to a fastening place 150 at the vehicle 1. Both pull-cables 141 and 146 extend between the guide pulleys 143 and 144 or 148 and 149 within the hollow interior of the cross-beam 14. For this purpose the cross-beam 14 is provided in its lower wall with openings 151 through which the pull-cables 141 and 146 enter into or emerge from the hollow interior of the cross-beam 14. Within the interior of the cross-beam additional guide-pulleys 152 are arranged for the guidance of the pull-cables 141 and 146, whereby the pull-cables 141 and 146 cross each other on their path within the cross-beam 14. In order to equalize differences in length and in order to constantly secure the pull-cables 141 and 146 in tensioned condition, springs 153 are provided at the ends of the cables, which springs bear at one end against the fastening place 145 or 150 and which force the cable end provided with an abutment 154 away from the fastening place. When passing through curves, the pull-cables 141 and 146 always guide the cross-beam 14 into the middle position.

If, for example, the vehicles pass through a left hand curve, then the pull-cable 146 swings the cross-beam 14 around to such an extent that the tensioned portions of both pull-cables 141 and 146 are again of uniform length. It will be seen, therefore, that also a control device like this for the cross-beam 14 will in no way interfere with the proper working of the coupling.

For the formation of a continuous level floor, a floor-plate 20 of sector-like formation is hinged at 67 to each of the long-sides of the cross-beam 14 in such manner that it is enabled to swing about its edge 68 (see Figs. 2 and 3). The floor-plates 20 rest with their circular edges 69 upon corresponding recesses 87 of the trailer floor 70 or of the floor 71 of the traction vehicle and thus form with the floors 70 and 71 a perfectly level continuous corridor through the two vehicles. The floor-plates 20 are positioned closely above the pendulum shaft 8, so that their swinging movements are comparatively slight ones. In order to avoid jamming or gaping of the floor-plates 20 it is advisable to devise them as shown in Figs. 32, 33 and 34. For this purpose every floor-plate is subdivided into two outer sectors 155 and an intermediate sector 156. The two outer sectors 155 are hingedly secured by hinges 67 to the cross-beam 14. The intermediate sector 156 is hinged to one of the outer sectors 155 by means of the hinge 157 and rests with its free end 158 upon an edge portion of the second outer sector. For silencing purposes it is advisable to interpose a rubber strip 159 between the sectors 155 and 156, and perhaps also between the floors 70 or 71 and the entire free edge of the floor-plate 20.

As a further important improvement the invention provides the passage between the two vehicles 1 and 2 with poles and hand rails in such manner that they in no way interfere with the lateral displacement of the vehicles in curves and with their displacement in height when elevated strips of ground are crossed. A construction like this is shown in Figs. 35, 36, 37 and 38. The fundamental feature of this construction is the provision, on both sides of the longitudinal middle portion of the vehicles 1 and 2 on the floors 70 and 71 and on both sides of the coupling on the cross-beam 14, of poles and of telescopically expandable hand rails rotatably coupled at both ends to said poles. For this purpose the invention provides the floor 71 of the vehicle 1 with vertical poles 160, and the floor 70 of the vehicle 2 with vertical poles 161, and the cross-beam 14 with vertical poles 162, whereby the correlated poles 160 and 162 are connected with each other by rails 163, and the correlated poles 161 and 162 by rails 164. The rails 163 and 164 are connected to the poles 160, 161 and 162 by universal joints 165 (see Fig. 37). In addition to this the rails 163 and 164 are of the telescopic kind, so that they are enabled to adapt themselves in length and position to the conditions of every curve. The pivot bolts 166 of the universal joints 165 in combination with the telescopic rails 163 and 164 permit an unconstrained slanting displacement of the poles 160, 161 and 162 with respect to each other during an upward displacement of the vehicles 1 and 2 with respect to each other. For this it suffices when the poles 160, 161 and 162 are secured to the floors 70 and 71 and to the cross-beam 14 either directly or by means of supporting structures, for example by means of sockets 167 with the aid of screws. It is preferable, however, to secure the poles also at their upper ends, for example, by connecting the upper ends of the poles 160, 161 to the roof 169 or 170 of the vehicles 1 or 2, and the poles 162 to the portions 171 of the yoke 15 (see Fig. 37). This increases the stability of the poles 160, 161, 162 and of the rails 163 and 164 and contributes considerably to the safety of the passengers using the poles and rails.

In order to make the connection between the traction vehicle 1 and the trailer 2 a perfect one, the invention further provides means which effect the steering of the wheels 3 of the trailer 2 in dependence upon the turning radius or steering angle of the traction vehicle 1.

For this purpose an arm 77 has been laterally arranged at the end of the frame 12 of the traction vehicle 1 (see Figs. 6 and 7). Fastened to the arm 77 is a ball pin 25, and linked to the latter is a rod 26 extending beneath the frame 11 of the trailer 2 toward the rear of the latter and which by means of a pivot bolt 79 is connected to a steering arm 27 which via a pivot pin 78 rotatably secured to the axle 80 turns the wheel 3. Rigidly secured to the steering arm 27 is a steering rod 81 which via a tie rod 30 and a steering rod 81 rotatably supported by means of a pivot pin 78 at the other end of the axle 80 turns the second wheel 3. The second axle 89 is provided with the same steering means as the axle 80. As connecting means between the steering arm 27 of the axle 80 and the steering arm 28 of the axle 89 serves a rod 29.

As in the aforedescribed steering contrivance the ball pin 25 is positioned in close proximity of the transverse shaft 8 acting as joint between the two vehicles 1 and 2, the displacement in height of the vehicles with respect to each other, which theoretically reduces the steering effects, is practically of no importance.

Notwithstanding this fact, a steering contrivance which eliminates also theoretically the aforesaid reducing effect has been shown in Figs. 8 to 12.

For this purpose, an arm 39 is rotatably supported by means of an eye 83 and a pin 38 in the middle of a transverse bar 82 arranged at the end of the frame 12 of the traction vehicle for rotation in longitudinal direction of the vehicles. The swinging arm 39 extends from the pin 38 in downward direction and is provided at its free end with a ball-head 40 to which is coupled by means of a ball-cap 41 a rigid fork-shaped member 42. The fork-ends are by means of the bolts 45 rotatably coupled to arms 44 oppositely arranged at a segment plate 33. The segment plate 33 is rotatably supported at a vertically extending bolt 43 arranged in the longitudinal center line of the trailer frame 11 by means of a transverse bar 84 and is provided with grooves arranged in the form of steps for the engagement therein of the cables 34 and 35. Arranged vertically to the segment plate 33 is a cable pulley 32 which is likewise provided with stepped cable grooves. The cable pulley 32 is positioned at the free end of a steering shaft 31 extending longitudinally of the frame 11 to the wheels 3 and rotatably supported in bearings 85 of transversely extending bars. The cables 34 and 35 have one of their ends fastened to the segment plate 33 at oppositely disposed places of the latter, then cross each other at the place where the segment plate 33 is in contact with the cable pulley 32, and then have their other ends fastened to the cable pulley 32. In this way the segment plate 33 and the cable pulley 32 are by means of the cables 34 and 35 connected with each other and form an angular gearing. The steering shaft 31 carries oppositely positioned steering levers 36 which are rigidly secured to the steering shaft 31 in the vicinity of the wheels 3 and at which engage by means of ball joints 86 subdivided tie rods 37. Every tie rod 37 is rotatably connected to the steering arm 27 which turns the wheels, as already described in the previous form of construction.

It is further possible to employ conical wheels instead of the segment plate 33 and the cable pulley 32.

When in a construction like that the vehicles become displaced with respect to each other in height, then the swinging arm 39 takes care that this has no disadvantageous effect upon the steering. According to the invention it is also possible to provide only one single axle of the trailer 2 with adjustable wheels 3 and to have the wheels of the other axle rigidly secured in position. A construction like that results in improved travelling steadiness for the trailer 2.

Link-vehicles or link-trains of the type described can be employed for traveling on roads and on rails and may consist of two or more vehicles.

Summing up it can be said that the new coupling, when compared with ball-couplings, has the advantage of greater stability, smaller runout of the gearing, and improved noiselessness, and when compared with the turn-ring-coupling as known from semi-trailer-trucks, the advantage that it concedes to the transverse shaft as well as to the cross-beam a possibility of motion, so that they can be guided by guide-rods in unconstrained fashion always into the most favorable position.

That is why the cross-beam is particularly suited as carrier of a yoke for the fastening thereto of the concertina walls which by the support afforded to them by the yoke are to a considerable extent protected against pressures from within or without, and whereby the yoke and the concertina walls may be so devised and arranged that the coupling is completely surrounded by them, so that a perfectly closed-up passage between the several vehicles is produced protecting the coupling means and the interior of the vehicles not only against draught but also against dirt and moisture.

The cross-beam may further serve as a means for the rotatable fastening thereto of the sector-like floor-plates in such manner that they can participate without jamming and also without gaping with respect to their supporting base in any movement of a vehicle.

And last but not least, the link-train provided with the new coupling is particularly suited for the steering of the trailer wheels with the aid of the turning radius or steering angle of the traction vehicle, because, on the one hand, the steering rods are partly arranged within the connecting passage underneath the coupling and therefore reliably protected against dirt and moisture, and because, on the other hand, the new coupling interferes in no way with the guidance of the steering rods.

What we claim as new and desire to secure by Letters Patent of the United States is:

1. An articulated connection for vehicles comprising, in combination, two coaxially superimposed substantially horizontal annular bearings, each bearing having an outer bearing ring, connecting means individually connected with said rings and with a different one of the connected vehicles, each bearing having an inner bearing ring, a substantially horizontal shaft traversing the rotation axes of said bearings and swingably interconnecting said inner bearing rings, a substantially horizontal beam member supported by said bearings and positioned parallel to said shaft and being interposed between and extending substantially transversely to the travelling direction of the connected vehicles, a guide mechanism operatively connected with and interconnecting said bearings and including guide means movable on and guided by said beam member, floor plates operatively connected with said beam member, upright support means connected with said beam member, and a flexible wall mechanism connected with said support means.

2. An articulated connection as defined in claim 1 including resilient means interposed in said connecting means.

3. An articulated connection as defined in claim 1, said connecting means including support rings individually surrounding said outer bearing rings and being individually connected with the connected vehicles, and resilient means interposed between said support rings and the respective outer bearing rings.

4. An articulated connection as defined in claim 1, said connecting means including support rings individually surrounding said outer bearing rings and being individually connected with the connected vehicles, and rubber elements interposed between said support rings and the respective outer bearing rings and being fixed to the inside of said support rings.

5. An articulated connection as defined in claim 1, said connecting means including support rings individually surrounding said outer bearing rings and being individually connected with the connected vehicles, and springs interposed between said support rings and the respective outer bearing rings.

6. An articulated connection as defined in claim 1, said guide mechanism including substantially horizontal guide rods individually vertically pivoted to the connected vehicles, and vertical pivots pairwise swingably connecting the guide rods which are pivoted to different vehicles, said beam member having a recess extending longitudinally of said member, said pivots being slidably guided in said recess to move transversely to the longitudinal axes of said pivots, said guide rods guiding said beam member to bisect the angle made by the longitudinal axes of the connected vehicles.

7. An articulated connection as defined in claim 1, said guide mechanism including flexible elements, each of said elements having an end connected with one of the connected vehicles and having another end connected with the other of the connected vehicles, pulleys mounted on said beam member, said flexible elements being guided by said pulleys and maintaining said beam member in a position in which said beam member bisects the angle made by the longitudinal axes of the connected vehicles.

8. An articulated connection as defined in claim 1, said guide mechanism including arms connected with and extending from the connected vehicles and having free ends pivotally connected at the axis of rotation of one of said bearings, two pairs of guide rods, the guide rods of each pair having ends individually pivoted to said arms for horizontal swinging of the guide rods, a vertical pivot pivotally connecting the other ends of the guide rods of each pair, said beam member having a slot extending longitudinally of said beam member, said pivots extending into and being guided by said slot to move transversely to the longitudinal axes of said pivots and guiding said beam member to bisect the angle made by the longitudinal axes of the connected vehicles.

9. An articulated connection according to claim 8 in which one of said arms is rigidly connected with one of the connected vehicles and the other arm is connected with the other vehicle by means of links interconnected by a horizontal pivot and individually pivoted to the other vehicle and to the other arm.

10. An articulated connection according to claim 8 in which said beam member includes two parallel spaced bars mounted on one of said inner bearing rings, the space between said bars forming said slot for guiding said pivots.

11. An articulated connection as defined in claim 1 in which said beam member is hollow, said guide mechanism including two cables, each of said cables having one end connected with one of the connected vehicles and having the other end connected with the other of the connected vehicles, guide pulleys mounted on said beam member, said cables extending through said hollow beam member and being guided by said guide pulleys, said cables crossing each other within said hollow beam member and maintaining said beam member in a position in which said beam member bisects the angle made by the longitudinal axes of the connected vehicles.

12. An articulated connection as defined in claim 1, said upright support means being in the form of a frame-like yoke vertically mounted on the ends of said beam member, and said flexible wall mechanism including concertina-like walls connected with said yoke and with the connected vehicles to form a completely enclosed passage between the connected vehicles.

13. An articulated connection according to claim 12 in which said beam member is swingably supported by said shaft.

14. An articulated connection according to claim 1, said upright support means being in the form of a frame-like yoke vertically mounted on the ends of said beam member and having a horizontal top portion, said flexible wall mechanism including concertina-like walls connected with said yoke and with the connected vehicles to form a completely enclosed passage between the connected vehicles, and including flexible means connected to and interconnecting the center of said top portion with the connected vehicles.

15. An articulated connection according to claim 14, said flexible means including universal joint means individual mounted on said top portion and on the connected vehicles, and telescoping means individually interconnecting the universal joint means mounted on the vehicles with the universal joint means mounted on said top portion.

16. An articulated connection according to claim 14, said flexible means including a two-arm lever horizontally swingably mounted on said top portion, universal joints individually connected with the free ends of said lever, a universal joint connected with each of the connected vehicles, and connecting rods individually connecting the universal joints connected with the vehicles with the universal joints connected with said lever.

17. An articulated connection as defined in claim 1 in which said floor plates are hingedly secured to said beam member.

18. An articulated connection as defined in claim 1, said floor plates including a first pair of outer sector-like floor plates individually having a straight edge hingedly secured to one side of said beam member, a second pair of outer sector-like floor plates individually having a straight edge hingedly secured to the other side of said beam member, and sector-like floor plates individually disposed between the floor plates of said pairs of floor plates and individually having a first straight edge hingedly secured to the free straight edge of one of the floor plates of the respective pair and having a straight marginal portion slidably resting on the free straight marginal portion of the other floor plate of the respective pair.

19. An articulated connection according to claim 1, said upright support element being in the form of a frame-like yoke vertically mounted on the ends of said beam member, said flexible wall mechanism including concertina-like walls connected with said yoke and with the connected vehicles to form a completely enclosed passage between the connected vehicles, vertical poles mounted on said beam member inside of said yoke, vertical poles mounted on the connected vehicles inside of said walls, universal joints supported by said poles, and telescoping hand-rails individually connecting the universal joints on said poles on the vehicles with the universal joints on said poles on said beam member.

20. An articulated connection according to claim 19 including floors and roofs on the connected vehicles, said poles mounted on the vehicles individually extending between the floors and the roofs of the respective vehicles, said poles mounted on said beam member having upper ends connected with said yoke.

21. An articulated connection for vehicles comprising a substantially horizontal beam member interposed between the connected vehicles and extending substantially transversely to the travelling direction of the vehicles, a shaft revolvably supported by and being parallel to said beam member, two coaxially superimposed substantially horizontal annular ball bearings, said shaft traversing the rotation axes of said bearings, connecting means interconnecting one ball race of the first of said bearings with one of the connected vehicles, the other ball race of said first bearing being connected with said shaft, connecting means interconnecting one ball race of the second of said bearings with the other of the connected vehicles, the other ball race of said second bearing being connected with said beam member guide, a mechanism operatively connected with and interconnecting said bearings and including guide means movable on and guided by said beam member, floor plates operatively connected with said beam member, upright support means connected with said beam member, and a flexible wall mechanism connected with said support means.

22. An articulated connection for vehicles comprising a substantially horizontal beam member interposed between the connected vehicles and extending substantially transversely to the travelling direction of the vehicles, a shaft revolvably supported by and being parallel to said beam member, two superimposed substantially horizontal annular ball bearings, said shaft traversing the rotation axes of said bearings, connecting means interconnecting one ball race of the first of said bearings with one of the connected vehicles, the other ball race of said first bearing being connected with said shaft, connecting means interconnecting one ball race of the second of said bearings with the other of the connected vehicles, the other ball race of said second bearing being revolvably connected with said shaft, a guide mechanism operatively connected with and interconnecting said bearings and including guide means movable on and guided by said beam member, floor plates operatively connected with said beam member, upright support means connected with said beam member, and a flexible wall mechanism connected with said support means.

References Cited in the file of this patent

UNITED STATES PATENTS

| 1,535,799 | Adams | Apr. 28, 1925 |
| 1,581,688 | Pehrson | Apr. 20, 1926 |
| 1,704,394 | Link | Mar. 5, 1929 |
| 1,706,358 | Koch | Mar. 19, 1929 |
| 1,706,364 | Pehrson | Mar. 19, 1929 |
| 1,727,642 | Griffin | Sept. 10, 1929 |
| 2,193,156 | Antoine | Mar. 12, 1940 |
| 2,221,278 | Utterback | Nov. 12, 1940 |
| 2,322,192 | Jones | June 15, 1943 |
| 2,644,714 | Chiapella | July 7, 1953 |